United States Patent
Forghani-zadeh et al.

(10) Patent No.: US 9,483,065 B2
(45) Date of Patent: Nov. 1, 2016

(54) POWER REGULATION WITH LOAD DETECTION

(71) Applicant: TEXAS INSTRUMENTS INCORPORATED, Dallas, TX (US)

(72) Inventors: H. Pooya Forghani-zadeh, Allen, TX (US); Luis Alberto Huertas-Sanchez, Allen, TX (US); Sungho Beck, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 83 days.

(21) Appl. No.: 13/722,056

(22) Filed: Dec. 20, 2012

(65) Prior Publication Data
US 2013/0314061 A1 Nov. 28, 2013

Related U.S. Application Data

(60) Provisional application No. 61/650,924, filed on May 23, 2012.

(51) Int. Cl.
| H02M 3/156 | (2006.01) |
| --- | --- |
| G05F 1/46 | (2006.01) |
| H02M 3/158 | (2006.01) |
| H02M 1/00 | (2006.01) |

(52) U.S. Cl.
CPC .............. *G05F 1/46* (2013.01); *H02M 3/1588* (2013.01); *H02M 2001/0019* (2013.01); *H02M 2001/0022* (2013.01); *H02M 2001/0032* (2013.01); *H02M 2001/0048* (2013.01); *Y02B 70/1466* (2013.01); *Y02B 70/1491* (2013.01); *Y02B 70/16* (2013.01)

(58) Field of Classification Search
CPC .............. H02M 3/156–3/158; H02M 3/1563; H02M 3/1582; H02M 3/1588
USPC .......................................... 323/271, 282–288
See application file for complete search history.

(56) References Cited

U.S. PATENT DOCUMENTS

| 7,304,464 | B2* | 12/2007 | Weng et al. ................... 323/285 |
| --- | --- | --- | --- |
| 8,085,021 | B2* | 12/2011 | Chen et al. .................... 323/282 |
| 8,115,562 | B2* | 2/2012 | Igarashi ..................... 331/116 R |
| 8,319,482 | B2* | 11/2012 | Matsuo et al. ................. 323/224 |
| 8,541,993 | B2* | 9/2013 | Notman et al. ................ 323/271 |
| 8,552,703 | B2* | 10/2013 | Liu et al. ....................... 323/283 |
| 8,773,099 | B2* | 7/2014 | Granger ........................ 323/284 |
| 8,804,382 | B2* | 8/2014 | Stone ....................... H02M 1/36 363/127 |
| 2006/0164057 | A1* | 7/2006 | Kudo .................. H02M 3/1588 323/282 |
| 2010/0026256 | A1* | 2/2010 | Liu et al. ....................... 323/282 |

* cited by examiner

*Primary Examiner* — Gary L Laxton
*Assistant Examiner* — Kevin H Sprenger
(74) *Attorney, Agent, or Firm* — William B. Kempler; Frank D. Cimino

(57) ABSTRACT

One embodiment of the present invention includes a power regulator system. The system includes a power stage configured to provide an output voltage to a load in response to an input voltage and a control signal. The system also includes a feedback system that receives the input voltage and is configured to generate the control signal based on the output voltage. The system further includes a load detector configured to determine a state of the load and to set the power to the feedback system based on determining the state of the load.

14 Claims, 3 Drawing Sheets

POWER REGULATION WITH LOAD DETECTION

CROSS-REFERENCE TO RELATED APPLICATION

This application claims the benefit of U.S. Provisional Patent Application 61/650,924 filed on May 23, 2012, entitled ULTRA LOW QUIESCENT CURRENT BUCK REGULATOR FOR STANDBY CURRENTS, the entirety of which is incorporated by reference herein.

TECHNICAL FIELD

The present invention relates generally to electronic circuit systems, and specifically to a power regulator system with load detection.

BACKGROUND

It is typically desirable to implement power supply systems in a manner that is suitable to achieve optimal efficiency. As an example, efficient power supply systems that generate DC power from a battery can extend the operating life of the battery. Some power supply applications can include operating with a variable load over a long duration of time. For example, in a utility monitoring application and/or an application that includes remote sensors, battery life can be intended to last over a period of years (e.g., 15 to 20 years). In such applications, the circuits to which the power supply provides power are in an idle or shutoff mode most of the time, such that the only system that is operating can be a supervisory timing system (e.g., a real-time clock). Periodically, the circuit systems can be briefly switched to an operating mode to perform a function, after which the circuits can return to the idle or shutoff mode. During the idle or shutoff mode, the load can draw very low current, such as between approximately 0.5 micro-amps ($\mu A$) and 1 $\mu A$. Reducing the current draw in such idle or shutoff mode in such applications can extend the life of the battery for a year or more.

SUMMARY

One aspect of the invention includes a power regulator system. The system includes a power stage configured to provide an output voltage to a load in response to an input voltage and a control signal. The system also includes a feedback system that receives the input voltage and is configured to generate the control signal based on the output voltage. The system further includes a load detector configured to determine a state of the load and to set the power to the feedback system based on determining the state of the load.

Another aspect of the invention includes a method for conserving power in a power regulator. The method includes providing an output voltage to a load in response to an input voltage and a control signal. The method also includes comparing a reference voltage and a feedback voltage associated with the output voltage via an error amplifier to generate the control signal and determining a state of the load. The method also includes reducing a power associated with the error amplifier in response to determining a low-load state of the load.

Another aspect of the invention includes power regulator system. The system includes a power stage configured to provide an output voltage to a load in response to an input voltage and a control signal. The system also includes a feedback system comprising an error amplifier that receives the input voltage and is configured to generate a control signal based on a comparison of a reference voltage and a feedback voltage associated with the output voltage. The system further includes a load detector comprising a load-detection capacitor having a capacitor voltage, the load-detection capacitor being charged by a current source and being configured to indicate a low-load state of the load in response to the capacitor voltage increasing above a predetermined threshold, and to reduce a bias current of the error amplifier in response to determining the low-load state of the load.

DETAILED DESCRIPTION

This disclosure relates generally to electronic circuit systems, and specifically to a power regulation with load detection. A power regulator system can include a power regulator that is configured to generate an output voltage based on an input voltage. As an example, the power regulator can be a DC/DC regulator that generates a DC output voltage based on a DC input voltage, such as provided from a battery. The power regulator can include a power stage that can be configured as a switching stage to generate a current through an inductor that is coupled to the load in response to a control signal. The power regulator can also include a feedback system that is configured to generate the control signal, which can be implemented for pulse-width modulation (PWM) control of at least one switch in the power stage, based on a reference voltage and a feedback voltage that is associated with the output voltage. As an example, the feedback system can include an error amplifier that is configured to compare the reference voltage and the feedback voltage to generate the control signal.

The power regulator can also include a load detector that is configured to determine a state of the load to which the power regulator provides the output voltage. As an example, the load detector can determine a low-load state. For example, the low-load state can be determined based on a load-detection capacitor in the load detector that is charged via a current source. The load-detection capacitor can be discharged substantially concurrently with the operation of a low-side switch in the power stage. The load detector can determine the low-load state based on a voltage associated with the load-detection capacitor increasing above a predetermined threshold, such as occurring based on a lack of switching of the power stage at low-loads. During a non-low-load state, the feedback system can be provided substantially full power to provide rapid response to transients for substantial optimal efficiency of regulating the output voltage. However, in response to determining the low-load state, the load detector can be configured to set a power consumption level of the feedback system, such as to reduce the power of the error amplifier commensurate with reducing a quiescent current of the error amplifier. Accordingly, power consumption can be significantly reduced during low-load states.

Figure 1:
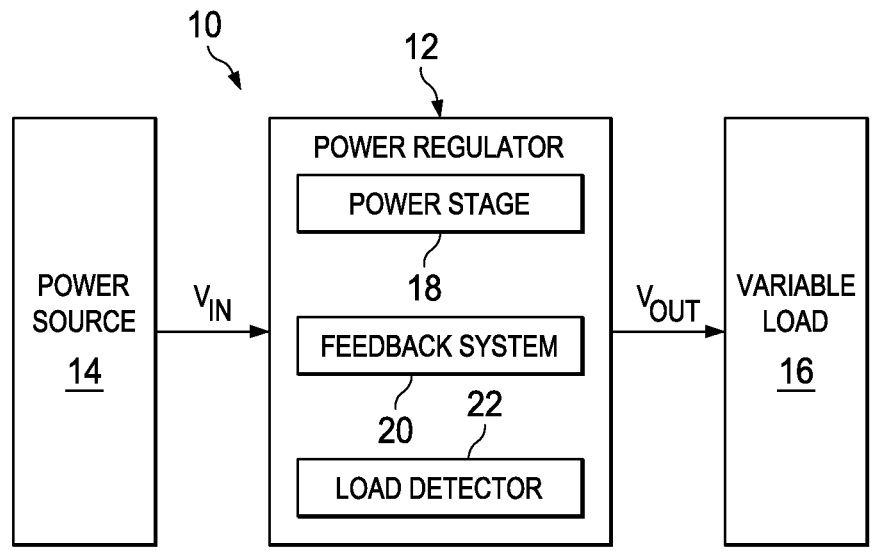
FIG. 1 illustrates an example of a power supply system in accordance with an aspect of the present invention.

FIG. 1 illustrates an example of a power supply system 10 in accordance with an aspect of the present invention. The power supply system 10 includes a power regulator 12 that is configured to generate an output voltage $V_{OUT}$ based on an input voltage $V_{IN}$. The input voltage $V_{IN}$ is provided from a power source 14 that can be configured, for example, as a battery. Thus, the input voltage $V_{IN}$ can be a DC voltage, such that the power regulator 12 can be configured as a DC/DC power regulator to provide the output voltage $V_{OUT}$ as a DC voltage. For example, the power regulator 12 can be a buck switching regulator. The output voltage $V_{OUT}$ is provided to a variable load 16. As an example, the variable load 16 can correspond to any of a variety of loads that can change, such as based on modes of operation. For example, the variable load 16 can correspond to one or more circuits that can operate in both a regular operating mode that requires a full regulated power from the power regulator 12 and in a standby or idle mode, such as requiring very low power from the power regulator 12.

In the example of FIG. 1, the power regulator 12 includes a power stage 18, a feedback system 20, and a load detector 22. The power stage 18 can include a variety of circuit components that are configured to generate the output voltage $V_{OUT}$ based on a control signal that corresponds to the regulated magnitude of the output voltage $V_{OUT}$. As an example, the power stage 18 can include a high-side switch and a low-side switch that are each controlled by a gate driver, such as via pulse-width modulation (PWM) control. The feedback system 20 can include an error amplifier that is configured to compare a reference voltage with a feedback voltage associated with the output voltage $V_{OUT}$.

The load detector 22 can be configured to detect a state of the variable load 18. As an example, the load detector 22 can determine that the load detector 22 is in a low-load state, such that the power requirements of the variable load 18 are significantly less than the power requirements of the variable load 18 during a regular operating mode. For example, the load detector 22 can include a load-detection capacitor that is charged via a current source in the order of 10 nano-amps (nA) of current and is discharged substantially concurrently with the low-side switch in the power stage 18. Thus, the low-load state can be determined based on a voltage across the load-detection capacitor increasing above a predetermined threshold. For instance, the voltage across the load detection capacitor can increase based on a lack of switching of the power stage 18, such as may occur at a low-load magnitude of the variable load 16. In response to determining a low-load state, the load detector 22 can be configured to set a power level of the feedback system 20, such as to reduce the power of the error amplifier based on mitigating a quiescent current flow of the error amplifier. Accordingly, power consumption can be significantly reduced during the low-load state.

Figure 2:
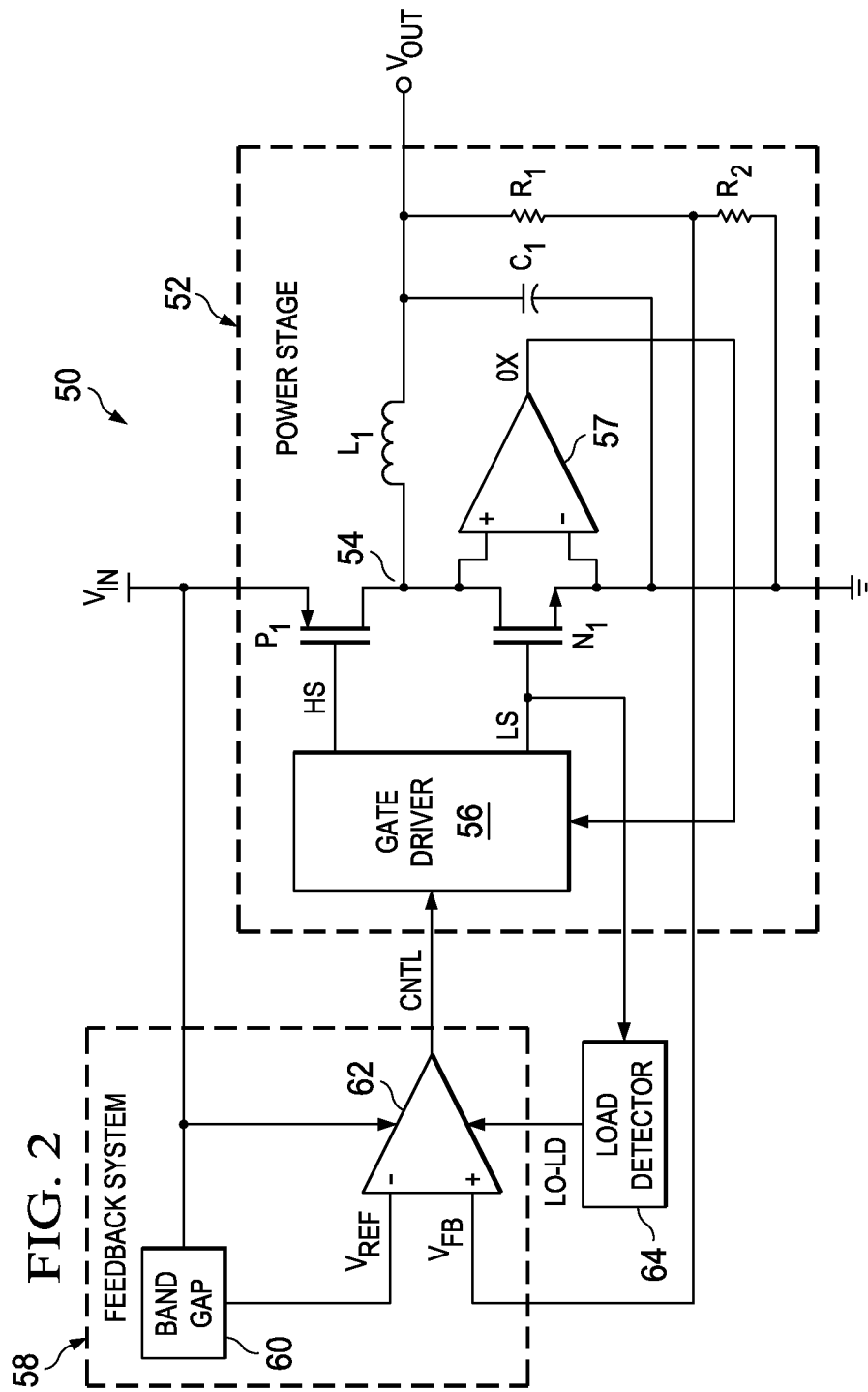
FIG. 2 illustrates an example of a power regulator in accordance with an aspect of the invention.

FIG. 2 illustrates an example of a power regulator 50 in accordance with an aspect of the invention. The power regulator 50 is configured to generate an output voltage $V_{OUT}$ based on an input voltage $V_{IN}$. The power regulator 50 can correspond to the power regulator 12 in the example of FIG. 1. For example, the input voltage $V_{IN}$ can be provided from the power source 14, such as a battery, and the output voltage $V_{OUT}$ can be provided to the variable load 16. Therefore, reference is to be made to the example of FIG. 1 in the following description of the example of FIG. 2.

In the example of FIG. 2, the power regulator 50 includes a power stage 52. The power stage 52 includes a P-type metal-oxide semiconductor field effect transistor (MOSFET) $P_1$ and an N-type MOSFET $N_1$ that are configured, respectively, as a high-side switch and a low-side switch. The high-side switch $P_1$ interconnects the input voltage $V_{IN}$ and a switching node 54 and the low-side switch $N_1$ interconnects the switching node 54 and a low-voltage rail, demonstrated in the example of FIG. 2 as ground. The power stage 52 also includes a gate driver 56 that is configured to control the high-side switch $P_1$ and the low-side switch $N_1$ via respective high-side and low-side signals HS and LS in response to a control signal CNTL. For example, the gate driver 56 can implement PWM control of the high- and low-side switches $P_1$ and $N_1$ based on the control signal CNTL. Thus, the gate driver 56 can be configured to alternately activate the high-side switch $P_1$ and the low-side switch $N_1$ to generate a currently flow through an inductor $L_1$ to generate the output voltage $V_{OUT}$ across an output capacitor $C_1$. As another example, while the high-side switch $P_1$ is demonstrated as a P-type MOSFET in the example of FIG. 2, the high-side switch $P_1$ could instead be designed as an N-type MOSFET using, for example, a bootstrapping gate drive technique.

The power stage 52 further includes a zero-crossing comparator 57 that is coupled across the low-side switch $N_1$. The zero-cross comparator 57 is thus configured to detect a current flow of approximately zero through the low-side switch $N_1$, and thus a substantially full discharge of the energy stored in the inductor $L_1$ (e.g., zero current flow). Such zero current flow through the low-side switch N1, and thus the inductor L1, can result from a high-load state based on consumption of power by the load (e.g., in a normal operating condition of the power regulator 50). The zero-crossing comparator 57 can thus de-assert a signal 0X that is provided to the gate driver 56 to indicate the zero current flow through the low-side switch $N_1$. In response to the de-assertion of the signal 0X, the gate driver 56 can deactivate the low-side switch $N_1$. Both the high- and low-side switches $P_1$ and $N_1$ can remain deactivated until the output voltage $V_{OUT}$ again decreases in magnitude less than the reference voltage $V_{REF}$. The high-side switch $P_1$ is then subsequently activated again to provide current flow through the inductor $L_1$. As a result, the power stage 52 can act in a discontinuous conduction mode (DCM) for substantially increased efficiency.

The power regulator 50 also includes a feedback system 58. The feedback system 58 includes a band gap generator 60 that is configured to generate a reference voltage $V_{REF}$ from the input voltage $V_{IN}$. The feedback system 58 also includes an error amplifier 62 that is configured to compare the reference voltage $V_{REF}$ with a feedback voltage $V_{FB}$ that is associated with the output voltage $V_{OUT}$ to generate the control signal CNTL. In the example of FIG. 2, the feedback voltage $V_{FB}$ is generated via a voltage divider formed from a first resistor $R_1$ and a second resistor $R_2$ in the power stage 52. The error amplifier 62 is provided power via the input voltage $V_{IN}$, and thus draws quiescent current from the power source 14 to bias the amplifier. As an example, during a normal operating mode, such that the power stage 52 provides a substantial normal power level to the variable load 16 having a state corresponding to normal operation (e.g., high-load state), the error amplifier 62 can be biased to draw a couple of micro-amps of current (e.g., approximately 2 μA), which can be sufficient for optimal operation of the error amplifier 62. As a result, the error amplifier 62, biased with a higher quiescent current than the low-load state, can operate with sufficient rapidity in comparing the reference voltage $V_{REF}$ with the feedback voltage $V_{FB}$ to generate the control signal CNTL for an efficient (e.g., more optimal) operation of the power regulator 50.

In addition, the power regulator 50 includes a load detector 64. The load detector 64 can be configured to monitor the low-side signal LS and to generate a signal LO-LD that can be indicative of a load state of the variable load 16. As an example, the signal LO-LD can be indicative of a low-load state of the variable load 16, such as can result from the variable load 16 being switched to an idle or sleep mode. The signal LO-LD is provided to the error amplifier 62 in the feedback system 58 to set the power of the error amplifier 62. For example, in response to determining the occurrence of the low-load state of the variable load 16, the load detector 64 can be configured to assert the signal LO-LD to reduce the quiescent current flow provided from the input voltage $V_{IN}$ (e.g., the power source 14) to the error amplifier 62. For example, the signal LO-LD can be provided to a switch that increases a resistance between the input voltage $V_{IN}$ and the electronics of the error amplifier 62. As a result, the quiescent current that is provided to the error amplifier 62 can be decreased to draw nano-amps of current (e.g., approximately 150 nA) to substantially mitigate power consumption of the power regulator 50 during the low-load state of the variable load 16. Because the low-load state of the variable load 16 can be indicative of an idle or sleep mode of the variable load, the error amplifier 62 may not need to implement rapid reaction to transients for regulation of the output voltage $V_{OUT}$, and thus can maintain efficient and suitable operation for regulating the output voltage $V_{OUT}$ in the low-load state at significantly reduced power.

It is to be understood that the power regulator 50 is not intended to be limited to the example of FIG. 2. As an example, the power stage 52 can include additional circuit components to facilitate regulation of the output voltage $V_{OUT}$, such as a freewheeling diode. Thus, the power regulator 50 can be configured in a variety of ways. In addition, it is to be understood that the power regulator 50 can be implemented as or as part of an integrated circuit (IC), such that the power regulator 50 can be implemented within an IC chip. For example, the inductor $L_1$ can be configured as a chip inductor.

Figure 3:
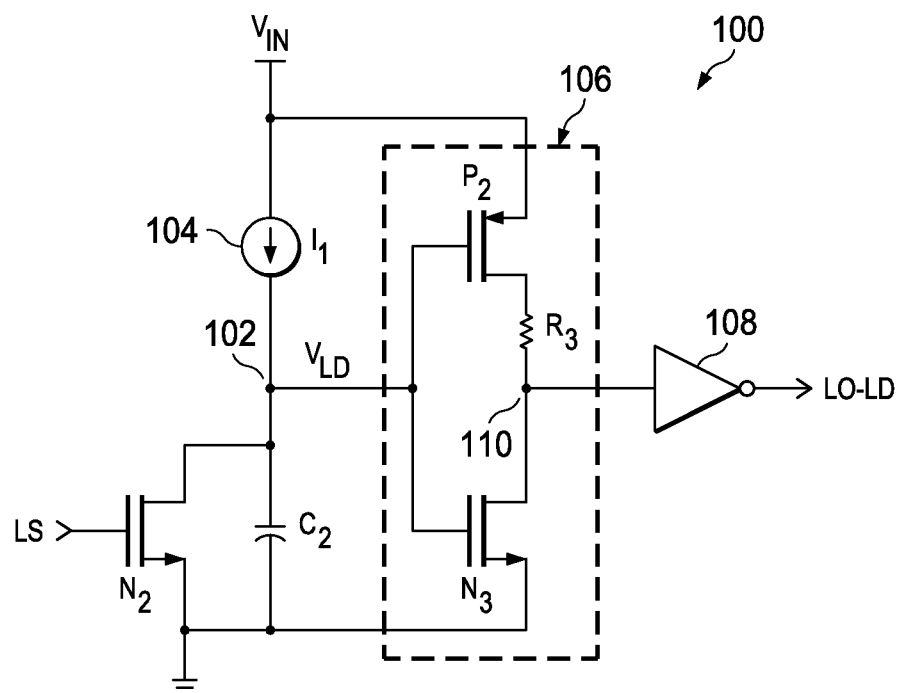
FIG. 3 illustrates an example of a load detector in accordance with an aspect of the present invention.

FIG. 3 illustrates an example of a load detector 100 in accordance with an aspect of the present invention. The load detector 100 can correspond to the load detector 64 in the example of FIG. 2. Therefore, reference is to be made to the example of FIG. 2 in the following description of the example of FIG. 3.

The load detector 100 includes an N-type FET $N_2$ that interconnects a node 102 and a low-voltage rail, demonstrated in the example of FIG. 3 as ground. The N-FET $N_2$ has a gate that is controlled via the low-side signal LS. Therefore, the N-FET $N_2$ is activated substantially concurrently with the low-side switch $N_1$, such as in response to the feedback voltage $V_{FB}$ being greater than the reference voltage $V_{REF}$. The load detector 100 also includes a current source 104 that interconnects the input voltage $V_{IN}$ and the node 102 and a load-detection capacitor $C_2$ that interconnects the node 102 and the low-voltage rail. As an example, the current source 104 can be configured to provide a current $I_1$ having a very low-current magnitude (e.g., approximately 40 nA) to charge the load-detection capacitor $C_2$. As another example, the load-detection capacitor $C_2$ can have a time constant (e.g., approximately 100 μsec) that is sufficient in duration to indicate a low-load state of the variable load 16, as described in greater detail herein.

While the low-side switch $N_1$, and thus the N-FET $N_2$, is deactivated, such as in response to the zero-crossing comparator 57 determining a substantial zero current flow through the low-side switch $N_1$, and thus the inductor $L_1$, the current $I_1$ provided by the current source 104 slowly charges the load-detection capacitor $C_2$. As a result, a voltage $V_{LD}$ across the load-detection capacitor $C_2$ begins to increase over time. In the example of FIG. 3, the load detector 100 also includes a first inverter 106 and a second inverter 108. The first inverter 106 is demonstrated as including P-type FET $P_2$ and an N-type FET $N_3$. The first inverter 106 is coupled at an input to the node 102 and has an output at a node 110. The first inverter 106 also includes a resistor $R_3$ that interconnects the P-FET $P_2$ and the node 110 and which is configured to reduce a current flow through the P-FET $P_2$ while the voltage $V_{LD}$ increases. In response to the voltage $V_{LD}$ increasing above a predetermined threshold, the N-FET $N_3$ activates, thus coupling the node 110 to the low-voltage rail to set the node 110 to a logic-low state. The second inverter 108 thus inverts the logic-low state at the node 110 to assert the signal LO-LD. Accordingly, the load-detector 100 indicates the low-load state in response to the voltage $V_{LD}$ increasing above the predetermined threshold based on the current supply 104 charging the load-detection capacitor $C_2$ for a predetermined duration of time.

As described previously, the N-FET $N_2$ is activated concurrently with the low-side switch $N_1$ via the low-side signal LS. During a non-low-load state of the variable load 16, and thus during a normal operating mode of the power regulator 50, the high- and low-side switches $P_1$ and $N_1$ can each be alternately activated rapidly to generate a sufficient magnitude of current flow through inductor $L_1$ to provide the requisite amount of power to satisfy the power requirements of the substantial magnitude of the variable load 16. Upon activation of the N-FET $N_2$, the N-FET $N_2$ couples the node 102 to the low-voltage rail, thus discharging the load-detection capacitor $C_2$. The voltage $V_{LD}$ thus decreases below the predetermined magnitude to deactivate the N-FET $N_3$ and to activate the P-FET $P_2$, thus coupling the node 110 to the input voltage $V_{IN}$ to set the node 110 to a logic-high state. The second inverter 108 thus inverts the logic-high state at the node 110 to de-assert the signal LO-LD, thus indicating that the variable load 16 is no longer in a low-load state. In the non-low-load state, the error amplifier 62 consumes more power and can respond more quickly to changes in load conditions, such as to provide improved regulation when compared to the low-load state.

Accordingly, the load detector 100 is configured to determine the state of the variable load 16 based on monitoring the low-side signal LS, and thus the action of the low-side switch $N_1$. For example, in a low-load state of the variable load 16, such as during an idle or sleep mode of the variable load 16, the magnitude of the variable load 16 could approach zero, such that the current flow through the inductor $L_1$ is approximately zero. As a result, the high- and low-side switches $P_1$ and $N_1$ very seldom activate, and thus causing the load detector 100 to indicate the low-load state based on the voltage $V_{LD}$ increasing and remaining above the predetermined threshold for a long duration of time. Accordingly, the power consumption of the error amplifier 62 can be reduced based on limiting the quiescent current flow to the error amplifier 62 from the input voltage $V_{IN}$. As another example, in a non-low-load state of the variable load 16, such as during a normal operating mode of the variable load 16, the variable load 16 could have a significantly greater magnitude, such that the high- and low-side switches $P_1$ and $N_1$ can activate substantially rapidly to generate an adequate current flow through the inductor $L_1$ to satisfy the power requirements of the variable load 16. As a result, the load detector 100 can de-assert the signal LO-LD to indicate the non-low-load state based on the N-FET $N_2$ being activated to discharge the load-detection capacitor $C_2$ before the voltage $V_{LD}$ increases above the predetermined threshold. Accordingly, the quiescent current flow to the error amplifier 62 from the input voltage $V_{IN}$ can be increased to allow for accurate and sufficient regulation of the output voltage $V_{OUT}$.

It is to be understood that the load detector 100 is not intended to be limited to the example of FIG. 3. For example, the load detector 100 could be configured to indicate a high-load state instead of a low-load state. For example, the load detector 100 could include an additional inverter at the output of the second inverter 108, such that the load detector can assert a high-load signal that can be provided to the error amplifier 62 to increase the current consumption of the error amplifier 62. Additionally or alternatively, the load detector 100 can implement a similar detection implementation using the high-side signal HS. Accordingly, the load detector 100 can be implemented in a variety of ways.

Figure 4:
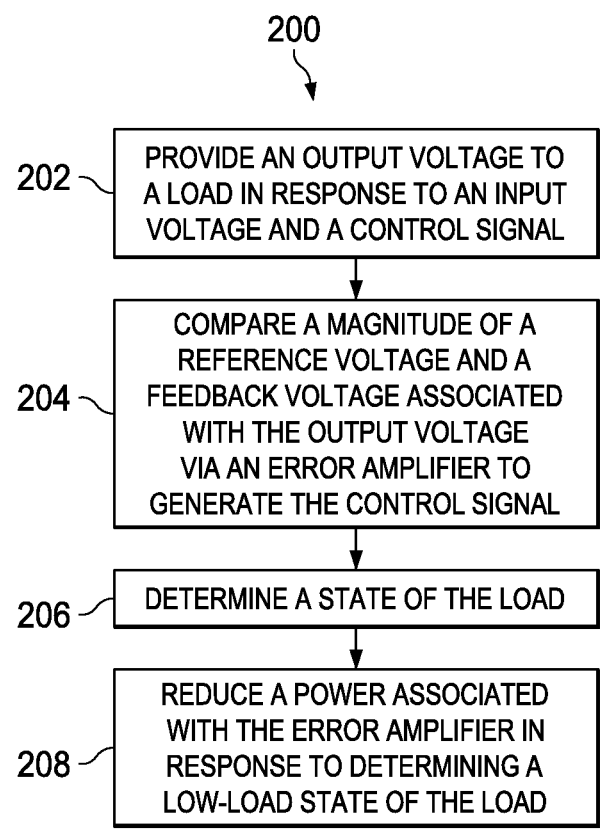
FIG. 4 illustrates an example of a method for conserving power in a power regulator system in accordance with an aspect of the present invention.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all illustrated features may be required to implement a method.

FIG. 4 illustrates an example of a method 200 for synchronizing communications in a communication system. At 202, an output voltage (e.g., the output voltage $V_{OUT}$) is provided to a load (e.g., the variable load 16) in response to an input voltage (e.g., the input voltage $V_{IN}$) and a control signal (e.g., the control signal CNTL). At 204, a reference voltage (e.g., the reference voltage $V_{REF}$) and a feedback voltage (e.g., the feedback voltage $V_{FB}$) associated with the output voltage is compared via an error amplifier (e.g., the error amplifier 62) to generate the control signal. At 206, a state of the load is determined. The determination of the state of the load can be a determination of a low-load state. At 208, a power associated with the error amplifier is reduced in response to determining a low-load state of the load. The reduction of the power can result from reducing a quiescent current flow from the input voltage to the error amplifier.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power regulator system comprising:
    a power stage configured to provide an output voltage to a load in response to an input voltage and a control signal, wherein the power stage is configured as a switching power stage comprising a high-side switch and a low-side switch configured to provide current through an inductor to generate the output voltage, and wherein a load-detection capacitor is coupled to a gate of the low-side switch for being discharged based on operation of the low-side switch;
    a feedback system that receives the input voltage and is configured to generate the control signal based on the output voltage; and
    a load detector configured to determine a state of the load and to control a power level to the feedback system based on determining the state of the load, wherein the load detector comprises the load-detection capacitor that is charged by a constant current source, wherein a level of charge on the load-detection capacitor is directly related to a state of the load, the load detection capacitor being coupled to a gate drive signal for the low-side switch and wherein the load detector comprises a third switch connected across the load-detection capacitor, the third switch being activated substantially concurrently with the low-side switch to discharge a capacitor voltage thereof.

2. The system of claim 1, wherein the load detector is configured to reduce a bias current of the feedback system in response to determining a low-load state of the load.

3. The system of claim 1, wherein the feedback system comprises an error amplifier that is configured to generate the control signal based on a comparison between a reference voltage and a feedback voltage associated with the output voltage.

4. The system of claim 3, wherein the load detector is configured to reduce a bias current of the error amplifier in response to determining a low-load state of the load.

5. The system of claim 1, wherein the power stage further comprises a zero-crossing comparator configured to detect a zero current flow through the inductor and to cause deactivation of the low-side switch in response to detection of the zero current flow through the inductor.

6. The system of claim 1, wherein the load-detection capacitor is coupled to node having a node voltage corresponding to a voltage across the capacitor, the node voltage increases as the load-detection capacitor is charged by the current source, the load detector further comprising an inverter that is coupled to the node and is configured to indicate a low-load state of the load in response to the load voltage increasing above a predetermined threshold and to indicate a non-low-load state of the load in response to discharging of the load-detection capacitor.

7. The system of claim 6, wherein the at least one inverter comprises a damping resistor to mitigate current flow through the at least one inverter.

8. An integrated circuit (IC) chip comprising the power regulator system of claim 1.

9. A method for conserving power in a power regulator, the method comprising:
    providing an output voltage to a load from a power regulator comprising a high-side switch and low-side switch that operate based on the control signal, in response to an input voltage and a control signal;
    comparing a reference voltage and a feedback voltage associated with the output voltage via an error amplifier to generate the control signal;
    determining a state of the load;
    reducing a power associated with the error amplifier in response to determining a low-load state of the load, wherein reducing the power associated with the error amplifier comprises reducing a bias current of the error amplifier in response to the low-load state and wherein determining the state of the load comprises:
    charging a load-detection capacitor via a current source to provide a capacitor voltage, wherein a level of charge on the capacitor is directly related to a state of the load;

discharging the load-detection capacitor according to a gate signal for operation of the low-side switch associated with the power regulator; and indicating the low-load state based on the capacitor voltage increasing above a predetermined threshold and indicating a non-low-load state if the capacitor voltage is below the predetermined threshold.

10. The method of claim 9, wherein indicating the low-load state comprises providing a digital load state signal via an inverter.

11. A power regulator system comprising:
a power stage configured to provide an output voltage to a load in response to an input voltage and a control signal;
a feedback system comprising an error amplifier that receives the input voltage and is configured to generate a control signal based on a comparison of a reference voltage and a feedback voltage associated with the output voltage; and
a load-detector comprising a load-detection capacitor having a capacitor voltage having a voltage level related to a state of the load, the load-detection capacitor being charged by a constant current source coupled to the input voltage and being configured to indicate a low-load state of the load in response to the capacitor voltage increasing above a predetermined threshold, and to reduce a bias current of the error amplifier in response to determining the low-load state of the load, wherein the load-detector comprises a switch connected across the load-detection capacitor, the switch being coupled to a gate of the low-side switch and being activated substantially concurrently with the low-side switch and the load-detection capacitor being discharged at a rate that is based on the state of the load.

12. The system of claim 11, wherein the power stage is configured as a switching power stage comprising a high-side switch and a low-side switch configured to provide current through an inductor to generate the output voltage, wherein a signal activating the low-side switch controls the switch across the load-detection capacitor for discharging the capacitor voltage thereof.

13. The system of claim 11, wherein the load-detector further comprises an inverter that is coupled to the load-detection capacitor and is configured to indicate the low-load state in response to the capacitor voltage increasing above the predetermined threshold.

14. A power regulator system comprising:
a power stage configured to provide an output voltage to a load in response to an input voltage and a control signal, wherein the power stage is configured as a switching power stage comprising a high-side switch and a low-side switch configured to provide current through an inductor to generate the output voltage, and wherein a load-detection capacitor is discharged based on operation of the high-side switch;
a feedback system that receives the input voltage and is configured to generate the control signal based on the output voltage; and
a load detector configured to determine a state of the load and to control a power level to the feedback system based on determining the state of the load, wherein the load detector comprises the load-detection capacitor that is charged by a constant current source, wherein a level of charge on the capacitor is directly related to a state of the load, the load detection capacitor being coupled to a gate drive signal for the high-side switch and wherein the load detector comprises a third switch connected across the load-detection capacitor, the third switch being activated substantially concurrently with the high-side switch to discharge a capacitor voltage thereof.

* * * * *